United States Patent
Chung et al.

(10) Patent No.: US 10,784,784 B2
(45) Date of Patent: Sep. 22, 2020

(54) DC-DC CONVERTER WITH DYNAMIC FEEDBACK LOOP

(71) Applicant: SEMICONDUCTOR COMPONENTS INDUSTRIES, LLC, Phoenix, AZ (US)

(72) Inventors: Bonggeun Chung, Siheung-si (KR); Taesung Kim, Seoul (KR); Gwanbon Koo, Sunnyvale, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 336 days.

(21) Appl. No.: 15/602,309

(22) Filed: May 23, 2017

(65) Prior Publication Data

US 2018/0342954 A1    Nov. 29, 2018

(51) Int. Cl.
*H02M 3/335* (2006.01)
*H02M 1/00* (2006.01)

(52) U.S. Cl.
CPC ........ *H02M 3/33507* (2013.01); *H02M 3/335* (2013.01); *H02M 2001/0025* (2013.01); *H02M 2001/0035* (2013.01)

(58) Field of Classification Search
CPC ............. H02M 3/335; H02M 3/33507; H02M 2001/0025; H02M 2001/0035
USPC ............................ 363/21.12–21.18, 125–127
See application file for complete search history.

(56) References Cited

U.S. PATENT DOCUMENTS

| | | | | |
|---|---|---|---|---|
| 5,034,871 | A * | 7/1991 | Okamoto | H02J 7/008 363/131 |
| 6,504,267 | B1 | 1/2003 | Giannopoulos | |
| 7,133,300 | B1 * | 11/2006 | Yang | H02H 7/122 363/56.11 |
| 8,804,380 | B2 | 8/2014 | Gao et al. | |
| 8,897,038 | B2 | 11/2014 | Li | |
| 9,225,199 | B2 | 12/2015 | Teggatz et al. | |
| 9,318,951 | B2 | 4/2016 | Shirahata et al. | |
| 9,444,349 | B2 * | 9/2016 | Sato | H02M 3/33507 |
| 9,755,530 | B2 | 9/2017 | Luo et al. | |
| 9,893,638 | B1 | 2/2018 | Strijker | |
| 9,991,806 | B2 | 6/2018 | Gong | |
| 10,141,830 | B1 * | 11/2018 | Chung | H02M 1/08 |

(Continued)

OTHER PUBLICATIONS

Fairchild Semiconductor Corp, "Design and Application of Primary-Side Regulation (PSR) PWM Controller", Nov. 16, 2011, Publisher: Fairchild Semiconductor Corp.

(Continued)

*Primary Examiner* — Thienvu V Tran
*Assistant Examiner* — Nusrat Quddus
(74) *Attorney, Agent, or Firm* — Dickinson Wright PLLC

(57) ABSTRACT

A power supply includes a controller integrated circuit that controls a switching operation of a primary switch based on a feedback voltage indicative of an output voltage of the power supply. The controller integrated circuit starts the switching of the primary switch when the feedback voltage reaches a first threshold voltage and stops the switching of the primary switch when the feedback voltage reaches a second threshold voltage. The controller integrated circuit adjusts the feedback voltage relative to the first threshold voltage to reduce the delay time to start switching the primary switch to increase the output voltage in response to changing load conditions.

20 Claims, 13 Drawing Sheets

(56) References Cited

U.S. PATENT DOCUMENTS

| | | | |
|---|---|---|---|
| 2002/0080625 A1 | 6/2002 | Goyhenetche et al. | |
| 2008/0265849 A1* | 10/2008 | Lee | H02M 1/36 323/238 |
| 2008/0266907 A1* | 10/2008 | Kim | H02M 1/36 363/21.1 |
| 2011/0103101 A1* | 5/2011 | Hiasa | H02M 3/33507 363/21.12 |
| 2011/0291575 A1* | 12/2011 | Shiu | H05B 33/0815 315/192 |
| 2012/0008342 A1* | 1/2012 | Hsu | H02M 3/33507 363/21.1 |
| 2013/0003421 A1* | 1/2013 | Fang | H02M 3/33523 363/21.01 |
| 2014/0016362 A1* | 1/2014 | Adragna | H02M 3/3376 363/21.02 |
| 2014/0071717 A1* | 3/2014 | Murata | H02M 3/33507 363/21.17 |
| 2014/0092647 A1* | 4/2014 | Ren | H02M 3/33553 363/21.17 |
| 2014/0160808 A1* | 6/2014 | Sato | H02M 3/33507 363/21.02 |
| 2014/0192565 A1 | 7/2014 | Wang | |
| 2014/0192566 A1 | 7/2014 | Yang | |
| 2015/0249390 A1* | 9/2015 | Fahlenkamp | H02M 3/33507 363/21.15 |
| 2015/0318777 A1* | 11/2015 | Pasqua | H02M 1/36 363/21.13 |
| 2016/0149490 A1* | 5/2016 | Nakamura | H02M 3/158 323/271 |
| 2016/0359421 A1 | 12/2016 | Lin et al. | |
| 2017/0047846 A1* | 2/2017 | Teo | H02M 3/33507 |
| 2017/0317602 A1 | 11/2017 | Kleinpenning et al. | |
| 2017/0338746 A1 | 11/2017 | Chen et al. | |
| 2018/0019677 A1 | 1/2018 | Chung et al. | |

OTHER PUBLICATIONS

Fairchild Semiconductor Corp, "Design Guideline for Primary Side Regulated (PSR) Flyback Converter Using FNA 103 and FSEZ13X7", Nov. 16, 2010.

Chung et al., "Variable Blanking Frequency for Resonant Converters", U.S. Appl. No. 15/636,833, filed Jun. 29, 2017.

* cited by examiner

DC-DC CONVERTER WITH DYNAMIC FEEDBACK LOOP

BACKGROUND OF THE INVENTION

1. Field of the Invention

The present invention relates generally to electrical circuits, and more particularly but not exclusively to power supplies.

2. Description of the Background Art

A switched mode power supply (SMPS) includes a switch element (also known as a "primary switch"), such as a metal oxide semiconductor field effect transistor (MOSFET), to convert an alternating current (AC) source to a regulated DC output voltage. An SMPS may include a converter that transforms a direct current (DC) voltage to another DC voltage. For example, an SMPS may include a DC-DC quasi-resonant converter.

A converter includes a feedback loop that allows the converter to maintain a regulated output voltage. The feedback loop senses the output voltage and controls the switching operation of the switch element to respond to changes in the output voltage. The output voltage reflects the load condition. The load condition is light when the load draws a small amount of output current from the SMPS, and the load condition is heavy when the load draws a large amount of output current from the SMPS. When the feedback loop indicates that the output voltage is relatively low, indicating the load is heavy, the converter may control the switching operation of the switch element in burst mode to increase the output voltage. Generally speaking, burst mode is a well-known converter feature for repeatedly switching the switch element on and off in bursts to increase the output power. When the feedback loop indicates that the output voltage is relatively high, indicating light load condition, the converter may stop, skip, or minimize the switching operation of the switch element for energy efficiency.

For loop stability, the feedback loop includes a compensator circuit that delays the response time of the converter to changes in load condition. Accordingly, the converter cannot rapidly respond when the load condition suddenly changes from light to heavy, resulting in a lowered output voltage. Adjusting the compensator circuit to shorten the delay time may affect the overall stability of the feedback loop.

SUMMARY

In one embodiment, a power supply includes a controller integrated circuit that controls a switching operation of a primary switch based on a feedback voltage indicative of an output voltage of the power supply. The controller integrated circuit starts the switching of the primary switch when the feedback voltage reaches a first threshold voltage and stops the switching of the primary switch when the feedback voltage reaches a second threshold voltage. The controller integrated circuit adjusts the feedback voltage relative to the first threshold voltage to reduce the delay time to start switching the primary switch to increase the output voltage in response to changing load conditions. In another embodiment, the feedback voltage is prevented from going below a minimum level to decrease the delay time to start switching the primary switch.

These and other features of the present invention will be readily apparent to persons of ordinary skill in the art upon reading the entirety of this disclosure, which includes the accompanying drawings and claims.

Figure 1:
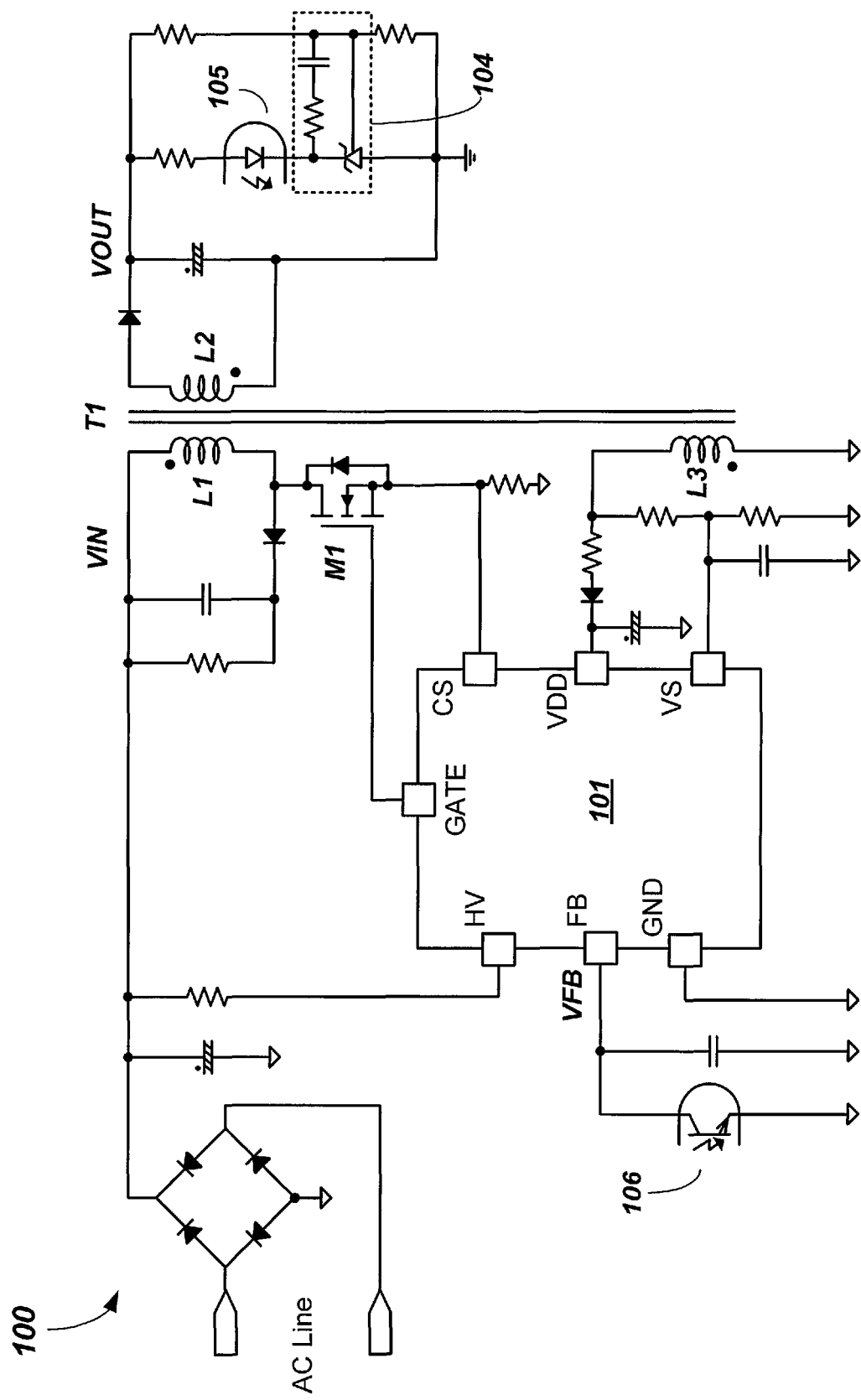
FIG. 1 shows a schematic diagram of a power supply in accordance with an embodiment of the present invention.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

For ease of reading, subscripts and superscripts that appear in the drawings are formatted below as normal fonts. For example, a signal that is labeled in the drawings as $V_{EXAMPLE}$ is simply written below as VEXAMPLE.

FIG. 1 shows a schematic diagram of a power supply 100 in accordance with an embodiment of the present invention. In the example of FIG. 1, the power supply 100 receives an AC line voltage, such as from a wall outlet, and rectifies and filters the AC line voltage to develop an input voltage VIN on a node of a primary winding L1 of a transformer T1. A switch element in the form of a transistor M1 (e.g., a MOSFET) serves as the primary switch. The transistor M1 connects and disconnects the primary winding L1 to ground to develop an output voltage VOUT for a load on the secondary winding L2 side of the transformer T1.

In the example of FIG. 1, a controller integrated circuit (IC) 101 (or some discrete controller) controls the switching operation of the transistor M1, e.g., by burst mode, to develop the output voltage VOUT. In the example of FIG. 1, the controller IC 101 implements a quasi-resonant converter, with the resonant circuit being formed by the inductance of the primary winding L1 and the lumped parasitic capacitance at the drain of the transistor M1. The controller IC 101 may include an HV pin for receiving the input voltage VIN, a GATE pin for driving the gate of the transistor M1, a CS pin for receiving a current sense signal that is indicative of the primary current through the primary winding L1, a VDD pin for developing an internal bias voltage from the auxiliary winding L3 of the transformer T1, a VS pin for receiving a voltage sense signal that is indicative of the output voltage VOUT, a GND pin for receiving a ground reference, and an FB pin for receiving a feedback signal indicative of the output voltage. In the example of FIG. 1, the feedback signal is a feedback voltage VFB that is received from the secondary side by way of a feedback circuit comprising an optocoupler formed by a light emitting diode 105 and a phototransistor 106. In the example of FIG. 1, the conduction of the phototransistor 106 increases with the output voltage VOUT. The feedback voltage VFB decreases as the output voltage VOUT increases, and increases as the output voltage VOUT decreases.

Generally speaking, the controller IC 101 may control the switching operation of the transistor M1 in accordance with conventional quasi-resonant converter operation with burst mode. Conventional operational features of the controller IC 101 are not described herein in the interest of clarity and brevity. The controller IC 101 differs from, and improves upon, conventional controller ICs in the way the controller IC 101 processes the feedback voltage before the feedback voltage is provided to a burst circuit block or other primary switch drive control circuit to improve response time to changing load conditions. As will be more apparent below, the controller IC 101 allows for fast response to rapid load transitions without having to compromise the response characteristics of the feedback loop compensator 104.

Figure 2:
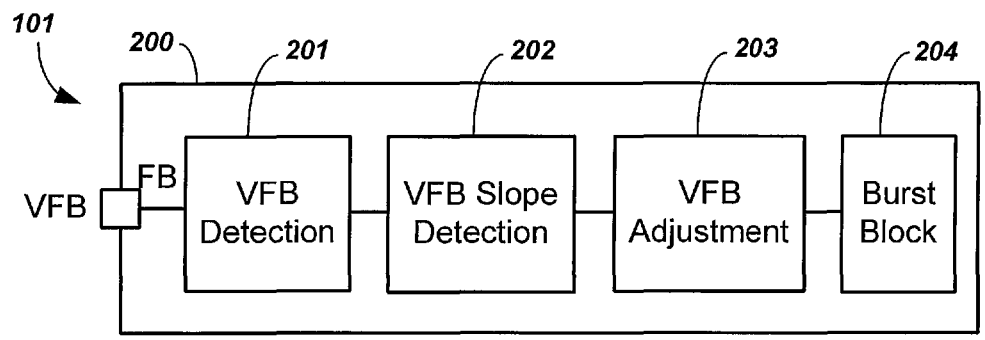
FIG. 2 shows a schematic diagram of a load transition detection circuit in accordance with an embodiment of the present invention.

FIG. 2 shows a schematic diagram of a load transition detection circuit 200 in accordance with an embodiment of the present invention. In the example of FIG. 2, the load transition detection circuit 200 is incorporated in the controller IC 101. In one embodiment, the load transition detection circuit 200 is configured to detect a rapid transition of the load condition from light load condition to heavy load condition and, in response thereto, to rapidly adjust the feedback voltage to thereby trigger switching of the primary switch to prevent output voltage dropout.

In the example of FIG. 2, the load transition detection circuit 200 comprises a feedback voltage detection circuit 201, a feedback voltage slope detection circuit 202, and a feedback voltage adjustment circuit 203. The adjusted feedback voltage output of the feedback voltage adjustment circuit 203 is provided to the burst circuit block 204. In one embodiment, the burst circuit block 204 places the converter IC 101 in burst mode when the feedback voltage VFB, adjusted or otherwise, reaches a burst on threshold voltage. When in burst mode, the converter IC 101 switches the transistor M1 on and off to increase the output voltage VOUT of the power supply 100. In one embodiment, the burst circuit block 204 stops the switching of the transistor M1 when the feedback voltage VFB reaches a burst off threshold voltage. In one embodiment, the converter IC 101 stops the switching of the transistor M1 when the feedback voltage decreases to or below the burst off threshold voltage, and starts the switching of the transistor M1 when the feedback voltage increases to or above the burst on threshold voltage.

In one embodiment, the feedback voltage detection circuit 201 is configured to detect changes in the feedback voltage VFB, which is received on the FB pin of the converter IC 101 (see also FIG. 1). The feedback voltage slope detection circuit 202 is configured to detect the slope of the feedback voltage VFB, and to determine if the slope of the feedback voltage VFB is rapidly increasing. That is, the feedback voltage slope detection circuit 202 detects when the feedback voltage VFB is increasing at a rate that is indicative of rapid transition from light load condition to heavy load condition. If so, the feedback voltage adjustment circuit 203 rapidly increases the feedback voltage VFB so that the feedback voltage VFB increases to the burst on threshold voltage and thereby trigger the burst circuit block 204 to place the converter IC 101 in burst mode to switch the transistor M1 and increase the output voltage VOUT in response to the changing load condition.

Figure 3:
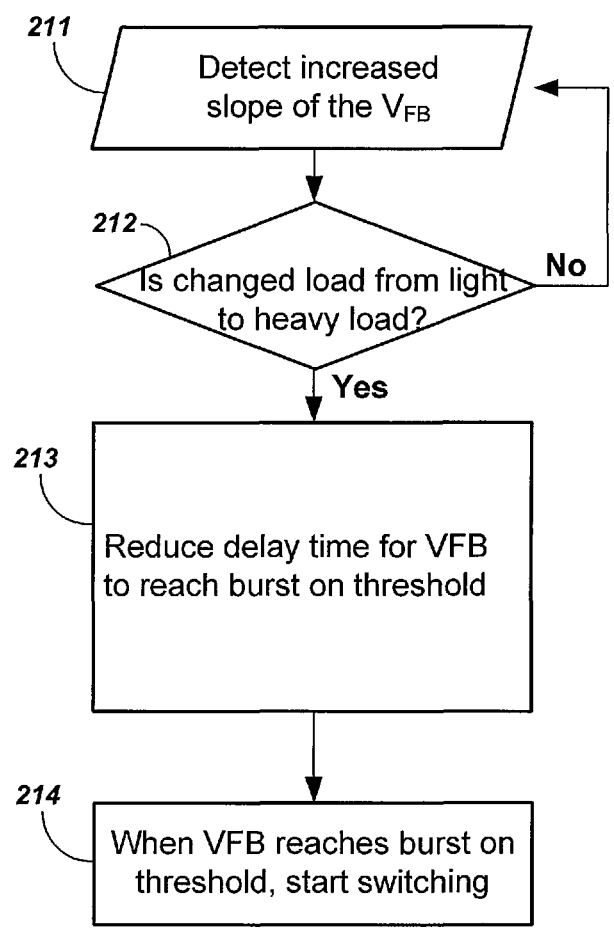
FIG. 3 shows a flow diagram of a method of responding to load transitions in accordance with an embodiment of the present invention.

FIG. 3 shows a flow diagram of a method of responding to load transitions in accordance with an embodiment of the present invention. The method of FIG. 3 may be performed by the load transition detection circuit 200 of FIG. 2.

In the example of FIG. 3, the feedback voltage detection circuit 201 receives the feedback voltage VFB, and the feedback voltage slope detection circuit 202 detects that the slope of the feedback voltage VFB is increasing (step 211). The feedback voltage slope detection circuit 202 determines whether or not the increasing slope of the feedback voltage VFB is caused by a change from light load condition to heavy load condition. In one embodiment, the feedback voltage slope detection circuit 202 deems that the increase in the slope of the feedback voltage VFB is caused by rapid transition from light load to heavy load when the slope of the feedback voltage VFB is steeper than a predetermined slope.

When the increase in the slope of the feedback voltage VFB is not caused by a rapid transition from light load to heavy load, the feedback voltage slope detection circuit 202 continues to monitor the slope of the feedback voltage VFB (step 212 to step 211). Otherwise, when the increase in the slope of the feedback voltage VFB is caused by rapid transition from light load to heavy load, the feedback voltage slope detection circuit 202 so informs the feedback voltage adjustment circuit 203, which in response thereto rapidly increases the feedback voltage VFB to reduce the delay time for the feedback voltage VFB to increase to the burst on threshold voltage of the burst circuit block 204 (step 213). Example circuits for reducing the delay time for the feedback voltage VFB to reach the burst on threshold voltage are disclosed below. When the feedback voltage VFB reaches the burst on threshold voltage, the controller IC 101 starts the switching of the transistor M1 in burst mode to increase the output voltage VOUT (step 214).

Figure 4:
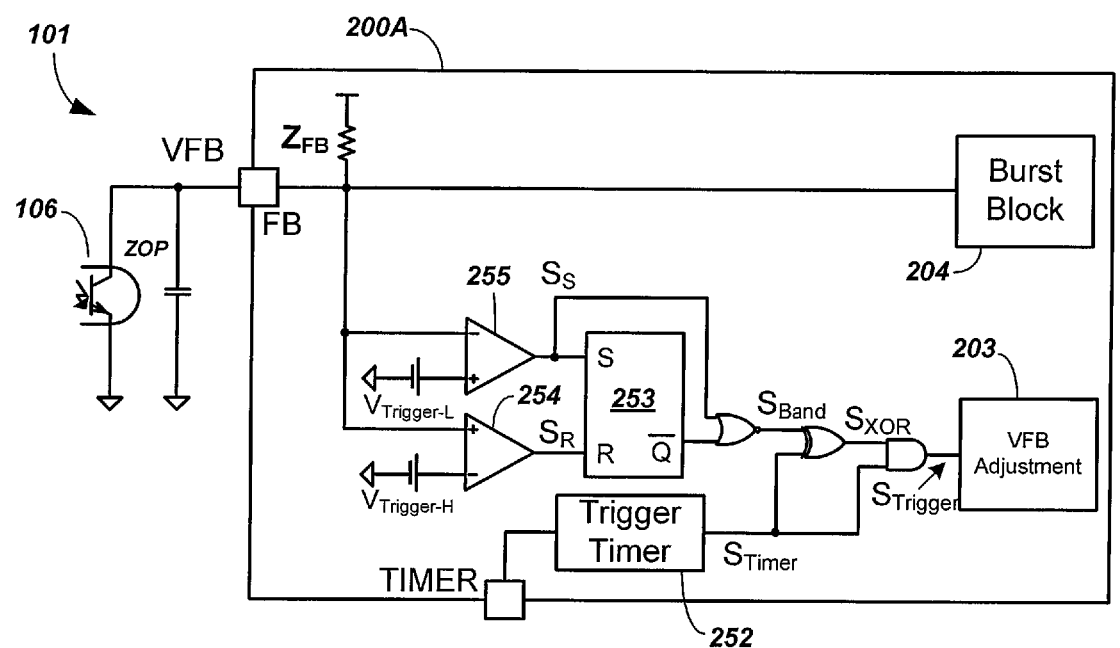
FIG. 4 shows a schematic diagram of a load transition detection circuit in accordance with an embodiment of the present invention.

FIG. 4 shows a schematic diagram of a load transition detection circuit 200A in accordance with an embodiment of the present invention. The load transition detection circuit 200A of FIG. 4 is a particular implementation of the load transition detection circuit 200 of FIG. 2. In one embodiment, the load transition detection circuit 200A is incorporated in the controller IC 101.

In the example of FIG. 4, the load transition detection circuit 200A includes a feedback voltage detection circuit comprising an amplifier 254, an amplifier 255, and a flip-flop 253. The feedback voltage VFB is received at the FB pin, which is pulled up by a feedback input impedance ZFB. The feedback input impedance ZFB is the input impedance presented by the controller IC 101 to the feedback voltage VFB. In the example of FIG. 4, the feedback voltage VFB is compared to a low trigger voltage (VTrigger-L) by the amplifier 255 and to a high trigger voltage (VTtrigger-H) by the amplifier 254. In the example of FIG. 4, a feedback voltage slope detection circuit is formed by a trigger timer 252 and associated logic gates that generate the SBand, SXOR, and STrigger signals. The controller IC 101 may optionally include a TIMER pin for receiving external components, e.g., resistors/capacitors, for programming the time of the trigger timer 252. As can be appreciated, the time of the trigger timer 252 may also be internally programmed. When the STrigger signal indicates rapid transition from light to heavy load condition, the feedback voltage adjustment circuit 203 adjusts the feedback voltage VFB relative to the burst on threshold voltage to reduce the delay time for the feedback voltage VFB to reach the burst on threshold voltage.

Figure 5:
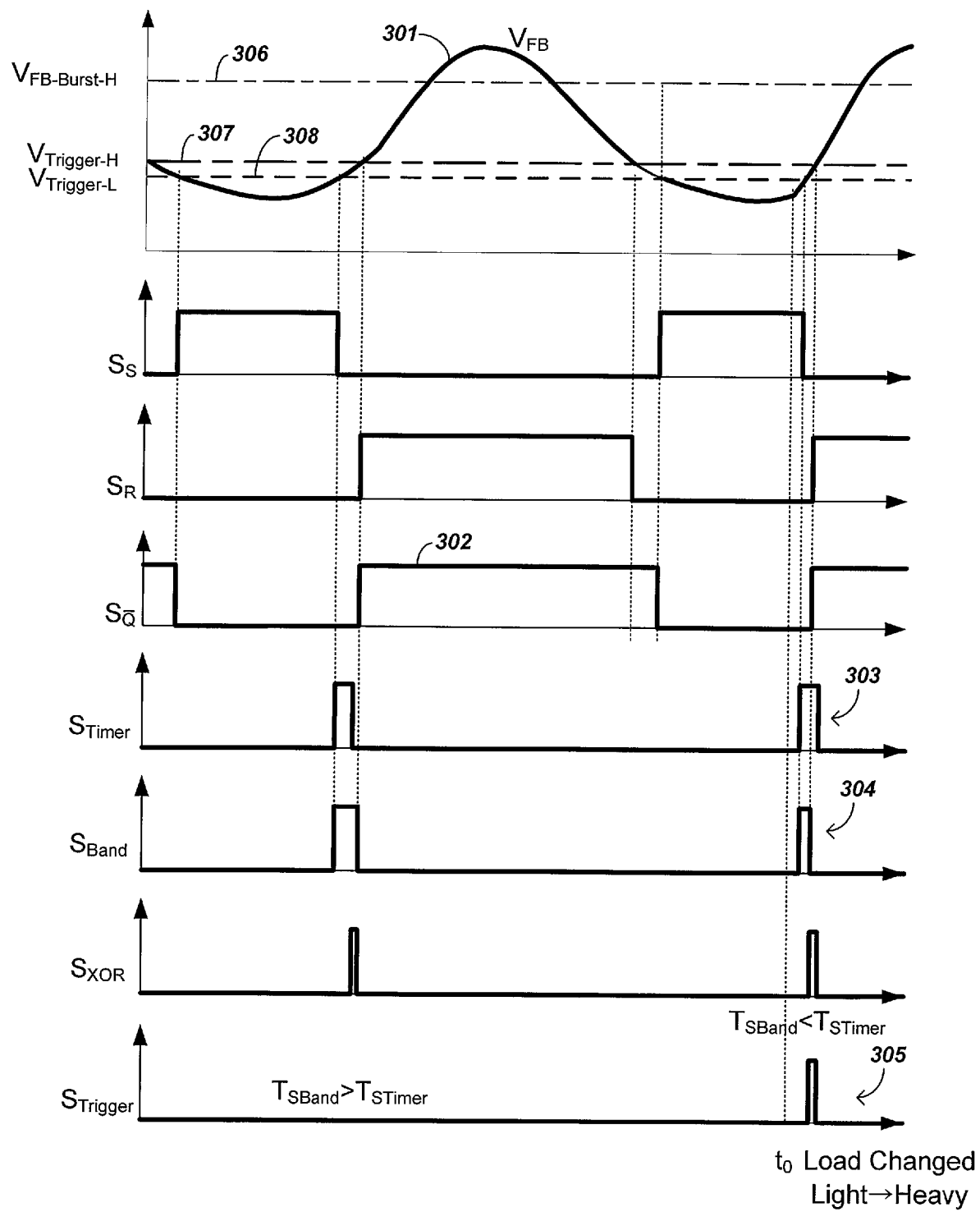
FIG. 5 shows waveforms of signals of the load transition detection circuit of FIG. 4 in accordance with an embodiment of the present invention.

FIG. 5 shows waveforms of signals of the load transition detection circuit 200A in accordance with an embodiment of the present invention. FIG. 5 shows, from top to bottom, the feedback voltage VFB (FIG. 5, 301), the SS signal output of the amplifier 255, the SR signal output of the amplifier 254, the SQNOT (FIG. 5, 302) output of the flip-flop 253, the STimer signal output of the trigger timer 252, the SBand signal, the SXOR signal, and the STrigger signal. FIG. 5 also shows the feedback voltage VFB relative to the burst on threshold voltage (FIG. 5, 306; also labeled as VFB-Burst-H), the high trigger voltage (FIG. 5, 307; VTrigger-H), and the low trigger voltage (FIG. 5, 308; VTrigger-L).

The STimer signal represents a predetermined rise time, i.e., slope, that indicates the feedback voltage increasing at a rate that is indicative of rapid transition from light load to heavy load. The SBand signal indicates the slope of the feedback voltage VFB as it rises from the low trigger voltage to the high trigger voltage. When the load changes from light to heavy, the impedance ZOP across the phototransistor 106 is increased instantly, thereby making the slope of the feedback voltage VFB steeper. When the time of the SBand signal is longer than the time of the STimer signal, the STrigger signal is not asserted. The STrigger signal is asserted when the time of the SBand signal is shorter than the time of the STimer signal.

In other words, when the load changes from light to heavy at time t0, the pulse width of the STimer signal (FIG. 5, 303) is wider than the pulse width of the SBand signal (FIG. 5, 304), indicating the slope of the feedback voltage VFB is steeper than the predetermined slope (as set by the trigger timer 252). In response, the STrigger signal is asserted (FIG. 5, 305) to indicate detection of rapid transition from light load to heavy load.

Figure 6:
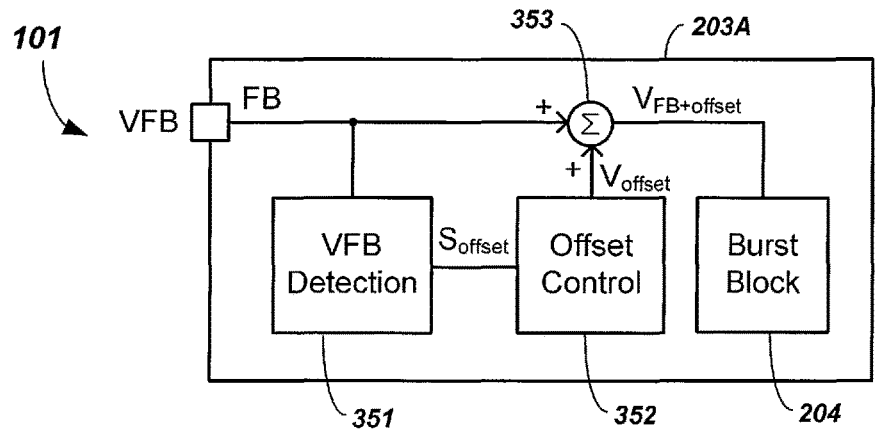
FIG. 6 shows a schematic diagram of a feedback voltage adjustment circuit in accordance with an embodiment of the present invention.

FIG. 6 shows a schematic diagram of a feedback voltage adjustment circuit 203A in accordance with an embodiment of the present invention. The feedback voltage adjustment circuit 203A is configured to adjust the feedback voltage VFB relative to the burst on threshold voltage of the burst circuit block 204 to reduce the delay time for the feedback voltage VFB to reach the burst on threshold voltage and thereby start switching the transistor M1 to increase the output voltage. The feedback voltage adjustment circuit 203A is a particular implementation of the feedback voltage adjustment circuit 203 of FIG. 2. The operation of the feedback voltage adjustment circuit 203A may be triggered by an indicator signal from the feedback voltage slope detection circuit 202, indicating rapid transition from light load to heavy load. The feedback voltage adjustment circuit 203A may receive the indicator signal through a switch or other interface circuit (not shown) without detracting from the merits of the present invention. Depending on the application, the feedback voltage adjustment circuit 203A may also be implemented to operate without having to receive an indicator signal. In one embodiment, the feedback voltage adjustment circuit 203A is incorporated in the controller IC 101.

In the example of FIG. 6, the feedback voltage adjustment circuit 203A includes a feedback voltage detection circuit 351, an offset control circuit 352, and a summer 353. The feedback voltage adjustment circuit 203A may be configured to receive the feedback voltage VFB at the FB pin of the controller IC 101, and to detect an increasing feedback voltage VFB. The feedback voltage adjustment circuit 203A generates an offset signal SOffset when the feedback voltage VFB increases to a feedback threshold voltage VFB-TH. In response to receiving the offset signal SOffset, the offset control circuit 352 generates an offset voltage Voffset, which the summer 353 adds to the feedback voltage VFB to generate an offset feedback voltage (VFB+offset). The offset feedback voltage, which is higher than the feedback voltage VFB, is provided to the burst circuit block 204 to initiate burst mode.

Figure 7:
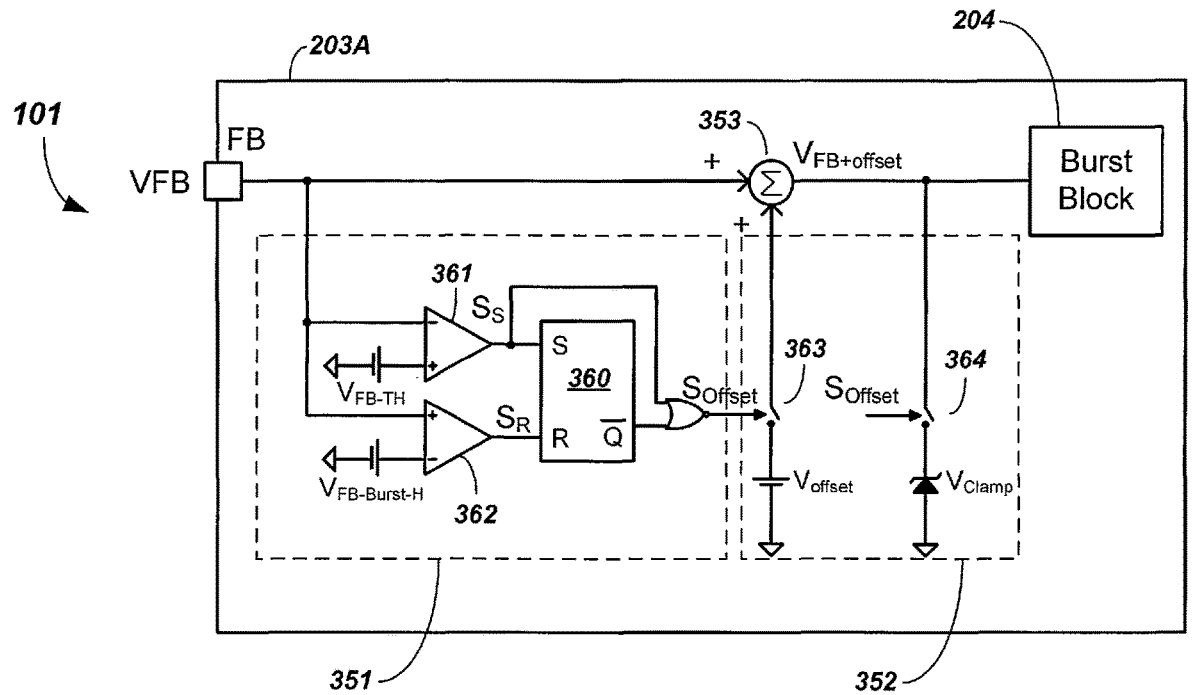
FIG. 7 shows another schematic diagram of the feedback voltage adjustment circuit of FIG. 6 in accordance with an embodiment of the present invention.

FIG. 7 shows another schematic diagram of the feedback voltage adjustment circuit 203A in accordance with an embodiment of the present invention. In the example of FIG. 7, the feedback voltage adjustment circuit 203A includes the feedback voltage detection circuit 351 comprising an amplifier 361, an amplifier 362, and a flip-flop 360. The feedback voltage VFB is received at the FB pin of the controller IC 101. The feedback voltage VFB is compared to the feedback threshold voltage by the amplifier 361 and to the burst on threshold voltage by the amplifier 362. The feedback voltage detection circuit 351 asserts the offset signal SOffset when the feedback voltage VFB increases to the feedback threshold voltage.

In the example of FIG. 7, the offset control circuit 352 includes switches 363 and 364, which are closed when the offset signal SOffset is asserted. Closing the switch 363 provides the offset voltage Voffset to the summer 353, which adds the offset voltage Voffset to the feedback voltage VFB. Closing the switch 364 clamps the offset feedback voltage output of the summer 353 to a clamp voltage Vclamp, which in one embodiment is equal to the burst on threshold voltage. In response to the offset feedback voltage reaching the burst on threshold voltage, the burst circuit block 204 initiates switching of the transistor M1 to increase the output voltage VOUT.

Figure 8:
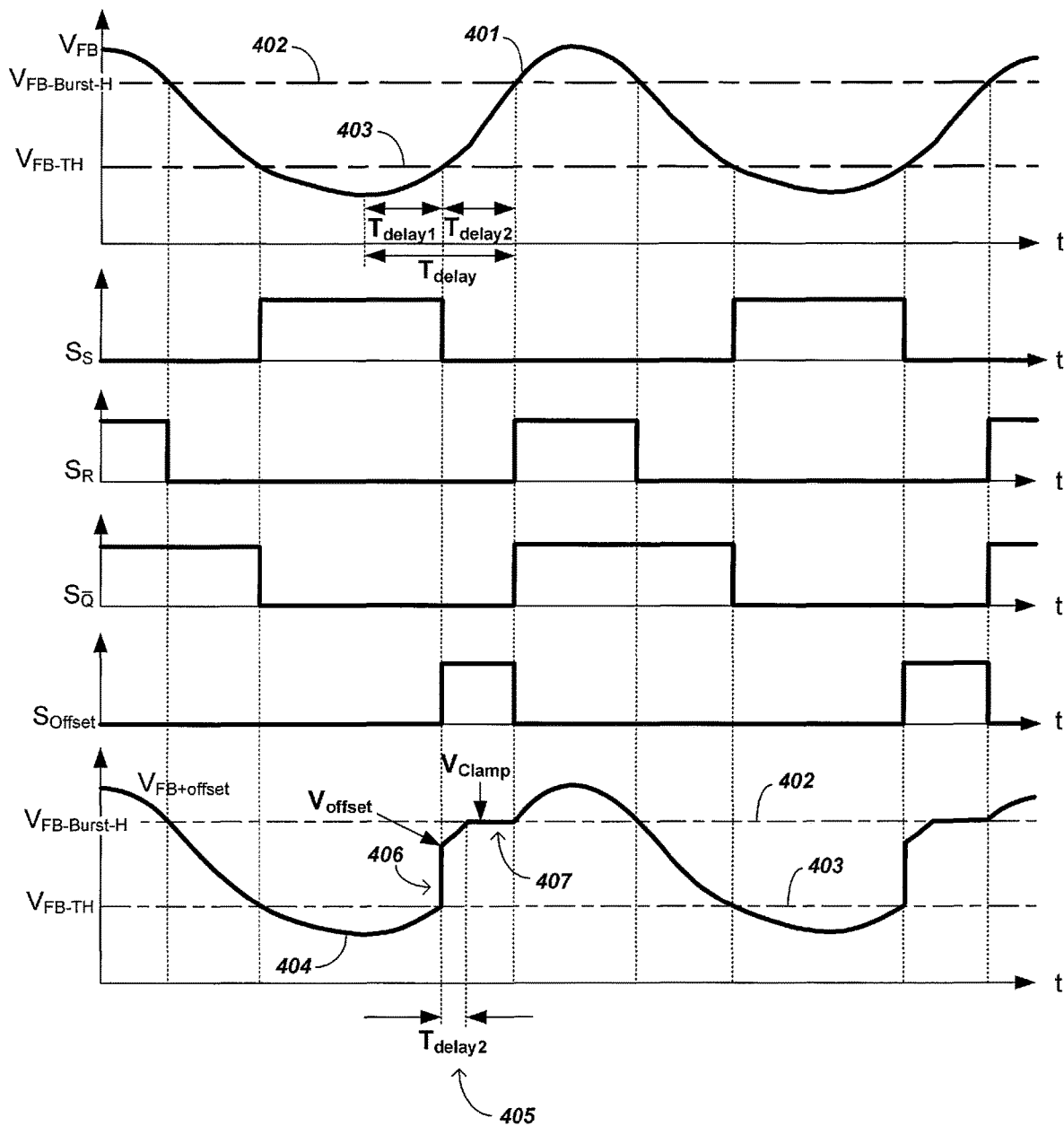
FIG. 8 shows waveforms of signals of the feedback voltage adjustment circuit of FIG. 7 in accordance with an embodiment of the present invention.

FIG. 8 shows waveforms of signals of the feedback voltage adjustment circuit 203A in accordance with an embodiment of the present invention. FIG. 8 shows, from top to bottom, the feedback voltage VFB when feedback voltage adjustment is not employed (FIG. 8, 401), the SS signal output of the amplifier 361, the SR signal output of the amplifier 362, the SQNOT output of the flip-flop 360, the offset signal SOffset, and the feedback voltage VFB with adjustment as in FIG. 6 (FIG. 8, 404).

FIG. 8 also shows the burst on threshold voltage (FIG. 8, 402; VFB-Burst-H) and the feedback threshold voltage (FIG. 8, 403; VFB-TH). The total delay time Tdelay is the sum of a first delay time Tdelay1 from when the heavy load is applied (in the example of FIG. 8, almost at the minimum of the feedback voltage VFB) to the feedback threshold voltage and of a second delay time Tdelay2 from the feedback threshold voltage to the burst on threshold voltage. To reduce the second delay time Tdelay2 (see 405), the offset control circuit 352 adds the offset voltage Voffset to the feedback voltage VFB when the feedback voltage VFB reaches the feedback threshold voltage. This accelerates the increase of the feedback voltage VFB to the offset feedback voltage (see 406), which is clamped to the clamped voltage VClamp at the burst on threshold voltage (see 407), resulting in starting to switch faster to increase the output voltage VOUT.

Figure 9:
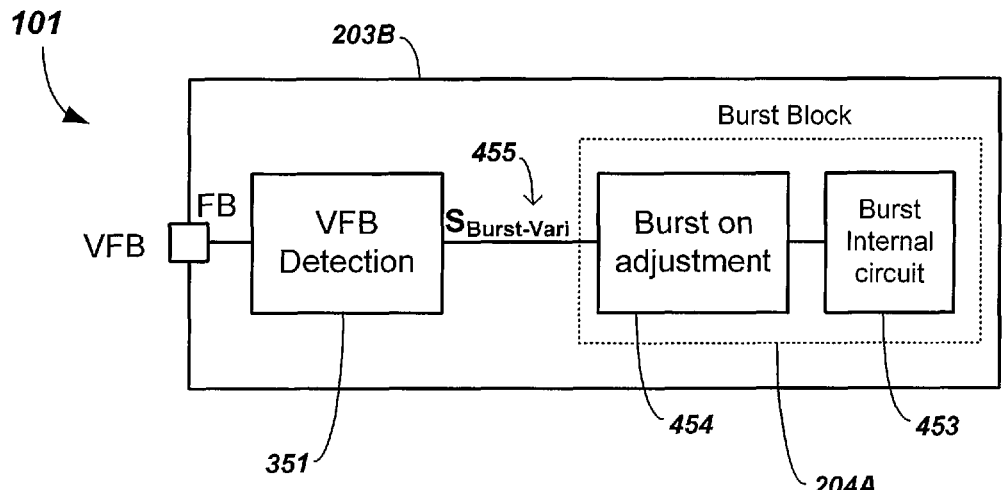
FIG. 9 shows a schematic diagram of a feedback voltage adjustment circuit in accordance with an embodiment of the present invention.

FIG. 9 shows a schematic diagram of a feedback voltage adjustment circuit 203B in accordance with an embodiment of the present invention. The feedback voltage adjustment circuit 203B is configured to adjust the feedback voltage VFB relative to the burst on threshold voltage of the burst circuit block 204A to reduce the delay time for the feedback voltage VFB to reach the burst on threshold voltage and thereby initiate burst mode. In one embodiment, the feedback voltage adjustment circuit 203B reduces the delay time by lowering the burst on threshold voltage.

The feedback voltage adjustment circuit 203B is a particular implementation of the feedback voltage adjustment circuit 203 of FIG. 2. The operation of the feedback voltage adjustment circuit 203B may be triggered by an indicator signal from the feedback voltage slope detection circuit 202, indicating rapid load transition from light to heavy load condition. The feedback voltage adjustment circuit 203B may receive the indicator signal through a switch or other interface circuits (not shown) without detracting from the merits of the present invention. Depending on the application, the feedback voltage adjustment circuit 203B may also be implemented to operate without receiving an indicator signal. In one embodiment, the feedback voltage adjustment circuit 203B is incorporated in the controller IC 101.

In the example of FIG. 9, the feedback voltage detection circuit 351 is the same as that described with reference to FIGS. 6 and 7, except that it outputs a burst on threshold vary signal (FIGS. 9 and 10, 455; SBurst-Vari) instead of an offset signal SOffset. In response to receiving the burst on threshold vary signal, the burst on adjustment circuit 454 changes the burst on threshold voltage. In one embodiment, the burst on adjustment circuit 454 lowers the burst on threshold to allow the burst internal circuit 453 to initiate burst mode at an earlier time.

Figure 10:
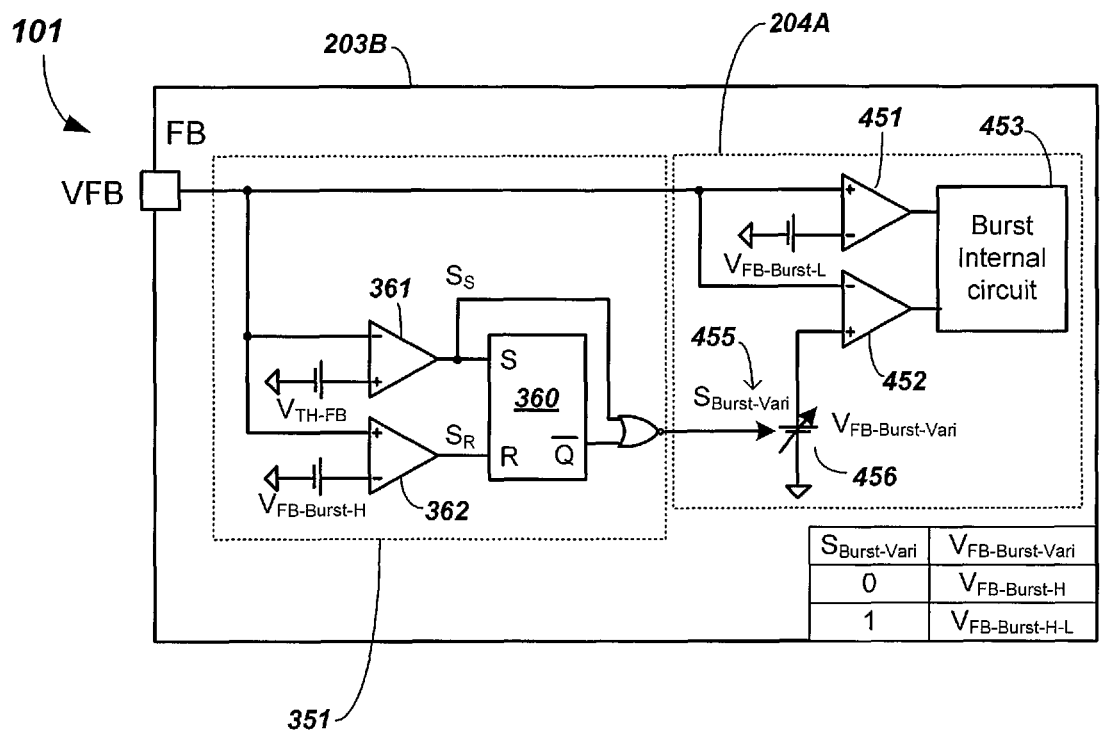
FIG. 10 shows another schematic diagram of the feedback voltage adjustment circuit of FIG. 9 in accordance with an embodiment of the present invention.

FIG. 10 shows another schematic diagram of the feedback voltage adjustment circuit 203B in accordance with an embodiment of the present invention. In the example of FIG. 10, the feedback voltage VFB is received at the FB pin of the controller IC 101. The feedback voltage VFB is compared to the feedback threshold voltage by the amplifier 361 and to the burst on threshold voltage by the amplifier 362. The feedback voltage detection circuit 351 generates the burst on threshold vary signal (FIG. 10, 455) when the feedback voltage VFB increase to the feedback threshold voltage.

In the example of FIG. 10, the burst on adjustment circuit 454 includes a variable voltage source 456 for generating a variable burst on threshold voltage (VFB-Burst-Vari). In one embodiment, the variable voltage source 456 generates the burst on threshold voltage (VFB-Burst-H) when the burst on threshold vary signal is a logical LOW, and generates a lower burst on threshold voltage (VFB-Burst-H-L) when the burst on threshold vary signal is a logical HIGH.

In the example of FIG. 10, an amplifier 451 compares the feedback voltage VFB to the burst off threshold voltage (VFB-Burst-L) to determine when to stop switching of the transistor M1, and an amplifier 452 compares the feedback voltage VFB to the voltage output of the variable voltage source 456. Because the output of the variable voltage 456 is lowered when the feedback voltage VFB increases to the feedback threshold voltage, the burst on threshold voltage of the burst circuit block 204A is effectively lowered, thereby reducing the delay time to start switching.

Figure 11:
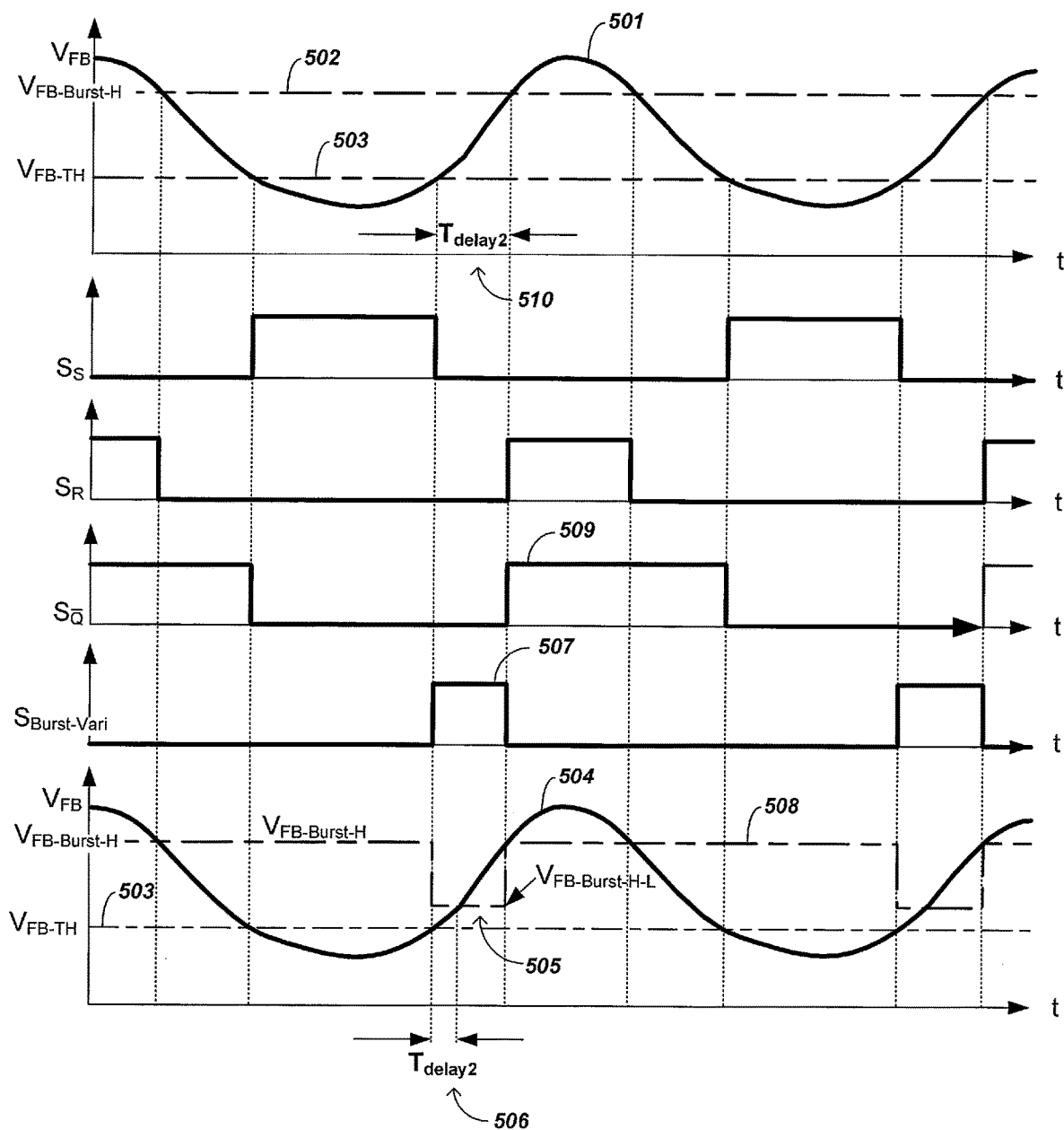
FIG. 11 shows waveforms of signals of the feedback voltage adjustment circuit of FIG. 10 in accordance with an embodiment of the present invention.

FIG. 11 shows waveforms of signals of the feedback voltage adjustment circuit 203B of FIG. 10 in accordance with an embodiment of the present invention. FIG. 11 shows, from top to bottom, the feedback voltage VFB when feedback voltage adjustment is not employed (FIG. 11, 501), the SS signal output of the amplifier 361, the SR signal output of the amplifier 362, the SQNOT output of the flip-flop 360 (FIG. 11, 509), the burst on threshold vary signal (FIG. 11, 507), and the feedback voltage VFB with adjustment as in FIG. 10 (FIG. 11, 504).

FIG. 11 also shows the burst on threshold voltage (FIG. 11, 502), the feedback threshold voltage (FIG. 11, 503), and the variable burst on threshold voltage (FIG. 11, 508). As shown in FIG. 11, by lowering the variable burst on threshold voltage (see FIG. 11, 505) the time delay (Tdelay2) is reduced (see FIG. 11, 506) compared to the time delay without adjustment (see FIG. 11, 510).

Figure 12:
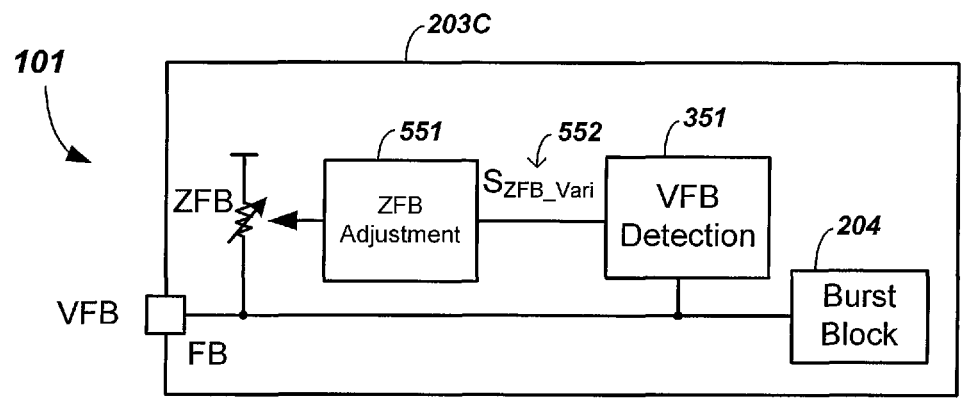
FIG. 12 shows a schematic diagram of a feedback voltage adjustment circuit in accordance with an embodiment of the present invention.

FIG. 12 shows a schematic diagram of a feedback voltage adjustment circuit 203C in accordance with an embodiment of the present invention. The feedback voltage adjustment circuit 203C is configured to adjust the feedback voltage VFB relative to the burst on threshold voltage of the burst circuit block 204 to reduce the delay time for the feedback voltage VFB to reach the burst on threshold voltage and thereby initiate burst mode operation. The feedback voltage adjustment circuit 203C reduces the delay time by lowering the feedback input impedance ZFB.

The feedback voltage adjustment circuit 203C is a particular implementation of the feedback voltage adjustment circuit 203 of FIG. 2. The operation of the feedback voltage adjustment circuit 203C may be triggered by an indicator signal from the feedback voltage slope detection circuit 202, indicating rapid load transition from light to heavy load condition. The feedback voltage adjustment circuit 203B may receive the indicator signal through a switch or other interface circuits (not shown) without detracting from the merits of the present invention. Depending on the application, the feedback voltage adjustment circuit 203C may also be implemented to operate without receiving an indicator signal. In one embodiment, the feedback voltage adjustment circuit 203C is incorporated in the controller IC 101.

In the example of FIG. 12, the feedback voltage detection circuit 351 is the same as that described with reference to FIGS. 6 and 7, except that it outputs an impedance vary signal (FIGS. 12 and 13, 552; SZFB_Vari) instead of an offset signal SOffset. In response to receiving the impedance vary signal, an impedance adjustment circuit 551 changes the feedback input impedance ZFB. In one embodiment, the impedance adjustment circuit 551 lowers the feedback input impedance ZFB to increase the feedback voltage VFB, thereby allowing the feedback voltage VFB to reach the burst on threshold of the burst circuit block 204 and initiate burst mode of operation at an earlier time.

Figure 13:
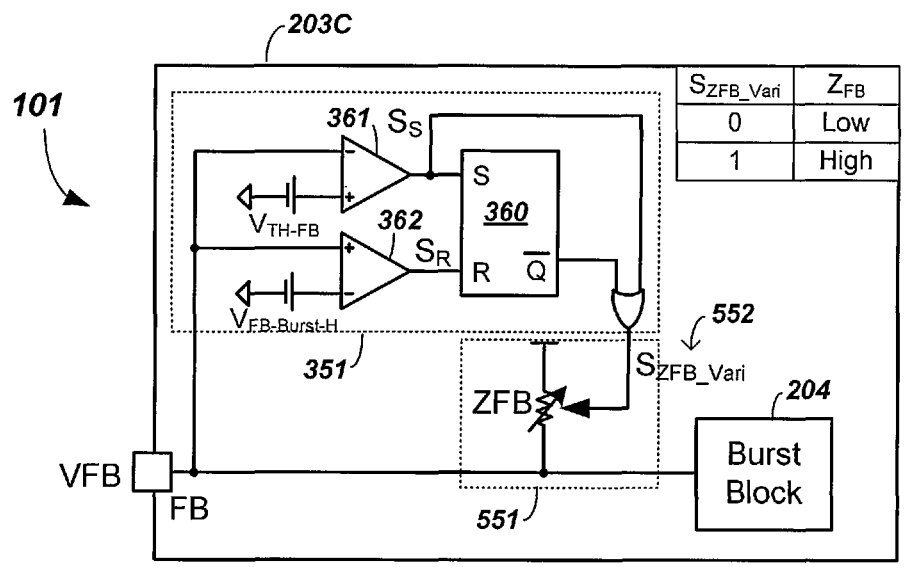
FIG. 13 shows another schematic diagram of the feedback voltage adjustment circuit of FIG. 12 in accordance with an embodiment of the present invention.

FIG. 13 shows another schematic diagram of the feedback voltage adjustment circuit 203C in accordance with an embodiment of the present invention. In the example of FIG. 13, the feedback voltage VFB is received at the FB pin of the controller IC 101. The feedback voltage VFB is compared to the feedback threshold voltage by the amplifier 361 and to the burst on threshold voltage by the amplifier 362. The feedback voltage detection circuit 351 generates the impedance vary signal (FIG. 13, 552) when the feedback voltage VFB increases to the feedback threshold voltage. In the example of FIG. 13, the impedance vary signal is active LOW, i.e., the impedance vary signal is asserted by driving it to logical LOW.

In the example of FIG. 13, the impedance adjustment circuit 551 includes a variable impedance component that provides the feedback input impedance ZFB. The variable impedance component may be implemented by a variable resistor or other component/circuit without detracting from the merits of the present invention. In one embodiment, the feedback input impedance ZFB has a low impedance (to increase the feedback voltage VFB) when the impedance vary signal is a logical LOW, and has a high impedance (for normal feedback voltage VFB level) when the impedance vary signal is a logical HIGH. Because the feedback input impedance ZFB is lowered when the feedback voltage VFB increases to the feedback threshold voltage, feedback voltage VFB is rapidly increased to reduce the time delay to reach the burst on threshold voltage.

Figure 14:
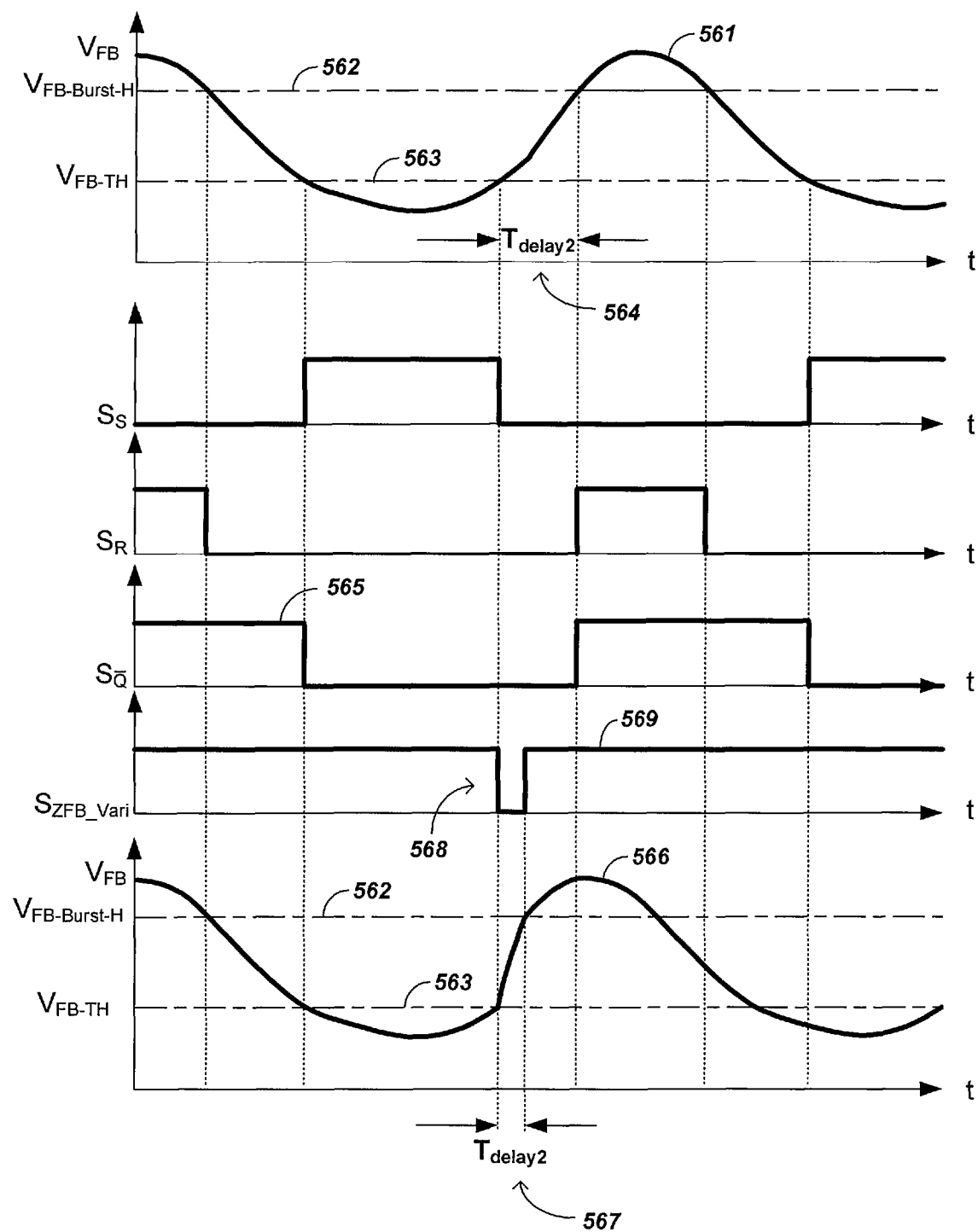
FIG. 14 shows waveforms of signals of the feedback voltage adjustment circuit of FIG. 13 in accordance with an embodiment of the present invention.

FIG. 14 shows waveforms of signals of the feedback voltage adjustment circuit 203C of FIG. 13 in accordance with an embodiment of the present invention. FIG. 14 shows, from top to bottom, the feedback voltage VFB when feedback voltage adjustment is not employed (FIG. 14, 561), the SS signal output of the amplifier 361, the SR signal output of the amplifier 362, the SQNOT output of the flip-flop 360 (FIG. 14, 565), the impedance vary signal (FIG. 14, 569), and the feedback voltage VFB with adjustment as in FIG. 13 (FIG. 14, 566).

FIG. 14 also shows the burst on threshold voltage (FIG. 14, 562) and the feedback threshold voltage (FIG. 14, 563). As shown in FIG. 14, by lowering the feedback input impedance ZFB when the impedance vary signal is asserted (see FIG. 14, 568), the time delay (Tdelay2) is reduced (see FIG. 14, 567) compared to the time delay without adjustment (see FIG. 14, 564).

Instead of adjusting the feedback voltage VFB relative to the burst on threshold voltage in response to changing from light load condition to heavy load condition, the feedback voltage VFB may be clamped to a minimum voltage at all load conditions. That is, the minimum value of the feedback voltage VFB may be set so that the time delay for the feedback voltage VFB to reach the burst on threshold voltage is improved for all load conditions and transitions. This feature of the present invention is now described with reference to FIGS. 15-21.

Figure 15:
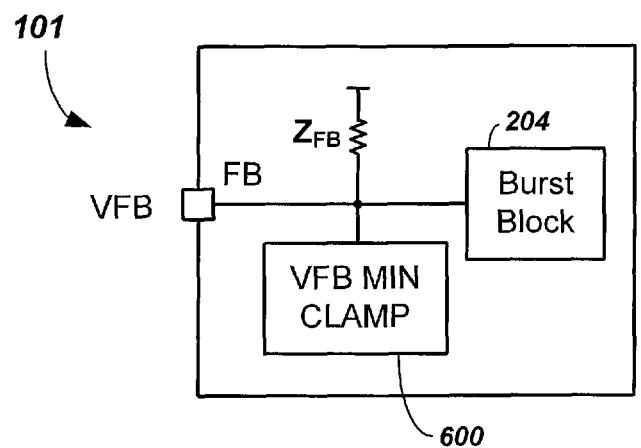
FIG. 15 shows a schematic diagram of a controller integrated circuit with minimum feedback voltage clamping in accordance with an embodiment of the present invention.

FIG. 15 shows a schematic diagram of a controller IC 101 with minimum feedback voltage clamping in accordance with an embodiment of the present invention. In the example of FIG. 15, the feedback voltage VFB is received at the FB pin of the controller IC 101 and pulled up by the feedback input impedance ZFB. In one embodiment, a feedback voltage clamp circuit 600 limits the minimum level of the feedback voltage VFB. That is, the feedback voltage clamp circuit 600 prevents the feedback voltage VFB from going below a predetermined minimum level. As before, the burst circuit block 204 initiates switching of the transistor M1 to increase the output voltage when the feedback voltage VFB increases to the burst on threshold voltage.

Figure 16:
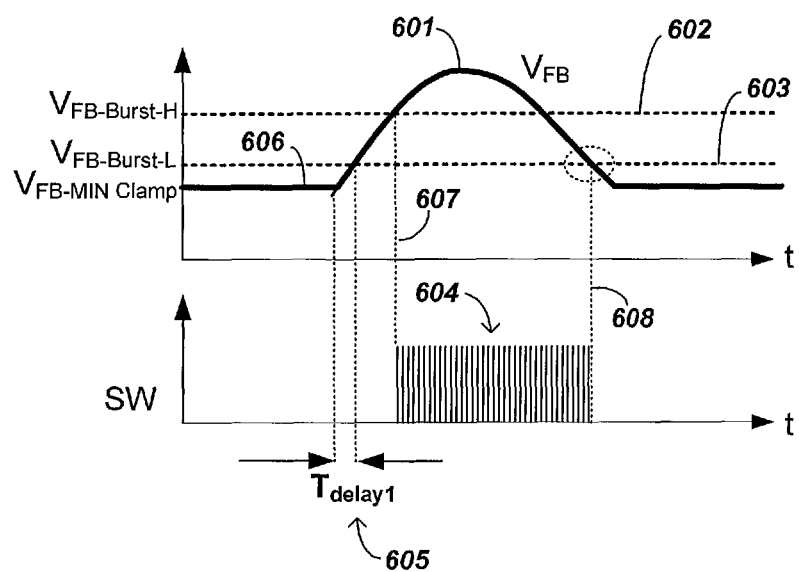
FIG. 16 shows waveforms of signals of the controller integrated circuit of FIG. 15 in accordance with an embodiment of the present invention.

FIG. 16 shows waveforms of signals of the controller IC 101 with the feedback voltage clamp circuit 600 in accordance with an embodiment of the present invention. FIG. 16 shows the feedback voltage VFB (FIG. 16, 601), the burst on threshold voltage (FIG. 16, 602), and the burst off threshold voltage (FIG. 16, 603). FIG. 16 also shows the gate drive signal to the transistor M1 (SW; FIG. 16, 604).

Generally speaking, the switching of the transistor M1 is started when the feedback voltage VFB increases to the burst on threshold voltage (FIG. 16, at 607), and is stopped when the feedback voltage VFB decreases to the burst off threshold voltage (FIG. 16, at 608). In burst mode, the switching of the primary switch is switched on and off in bursts (FIG. 16, 604).

In the example of FIG. 16, the feedback voltage VFB is prevented from going below a minimum clamped feedback voltage (FIG. 16, 606; VFB-MIN Clamp). Accordingly, the feedback voltage VFB is not lowered to less than the minimum clamped feedback voltage. This advantageously reduces the delay time for the feedback voltage VFB to reach the burst off threshold voltage (FIG. 16, 605), thereby minimizing the overall delay time for the feedback voltage VFB to increase to the burst on threshold voltage for all load conditions.

Figure 17:
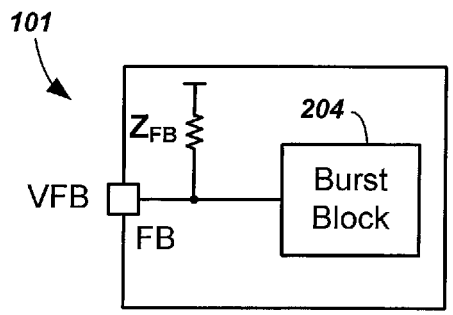
FIG. 17 shows a schematic diagram of a controller integrated circuit without minimum feedback voltage clamping.
Figure 18:
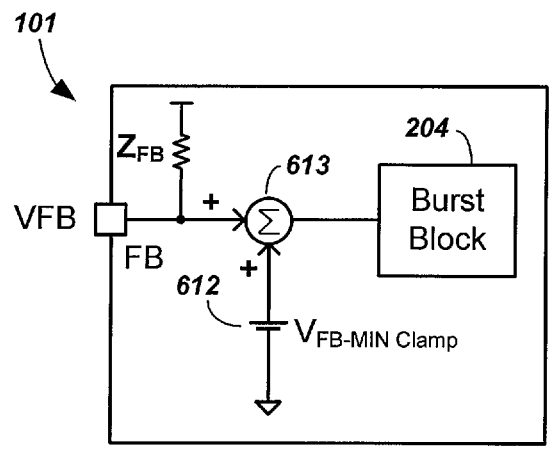
FIG. 18 shows a schematic diagram of a controller integrated circuit that implements minimum feedback voltage clamping by adding an offset voltage to the feedback voltage in accordance with an embodiment of the present invention.
Figure 19:
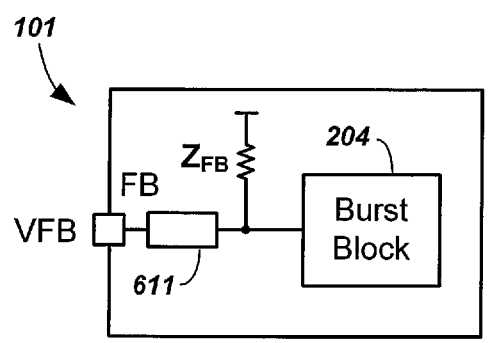
FIG. 19 shows a schematic diagram of a controller integrated circuit that implements minimum feedback voltage clamping by adding a voltage drop in series with the feedback voltage in accordance with an embodiment of the present invention.
Figure 20:
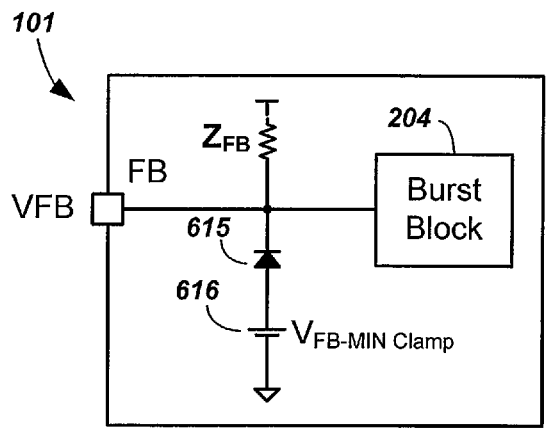
FIG. 20 shows a schematic diagram of a controller integrated circuit that implements minimum feedback voltage clamping by adding a clamp circuit.

FIG. 17 shows a schematic diagram of a controller IC 101 without minimum feedback voltage clamping. FIGS. 18-20 provide examples of adding minimum feedback voltage clamping to the circuit of FIG. 17. In FIGS. 17-20, the feedback voltage VFB is received at the FB pin of the controller IC 101. The feedback voltage VFB is pulled up by a feedback input impedance ZFB.

FIG. 18 shows a schematic diagram of a controller IC 101 that implements minimum feedback voltage clamping by adding an offset voltage to the feedback voltage VFB. In the example of FIG. 18, a positive offset voltage is provided by a voltage source 612. The positive offset voltage represents the minimum feedback voltage. A summer 613 adds the positive offset voltage to the feedback voltage VFB, thereby preventing the feedback voltage VFB from going below the minimum feedback voltage. The offset feedback voltage VFB is output by the summer 613 to the burst circuit block 204.

FIG. 19 shows a schematic diagram of a controller IC 101 that implements minimum feedback voltage clamping by adding a voltage drop in series with the feedback voltage VFB. The voltage drop may be provided by a component 611, such as a resistor or diode. The voltage drop on the component 611 represents the minimum feedback voltage. The feedback voltage VFB as provided to the burst circuit block 204 thus cannot go below the voltage drop.

FIG. 20 shows a schematic diagram of a controller IC 101 that implements minimum feedback voltage clamping by adding a clamp circuit at the FB pin. In the example of FIG. 20, the clamp circuit comprises a diode 615 and a voltage source 616. The voltage of the voltage source 616 represents the minimum feedback voltage. The clamp circuit clamps the minimum level at the FB pin to the diode drop plus the voltage provided by the voltage source 616. The feedback voltage VFB as provided to the burst circuit block 204 thus cannot go below the diode drop plus the voltage provided by the voltage source 616.

Figure 21:
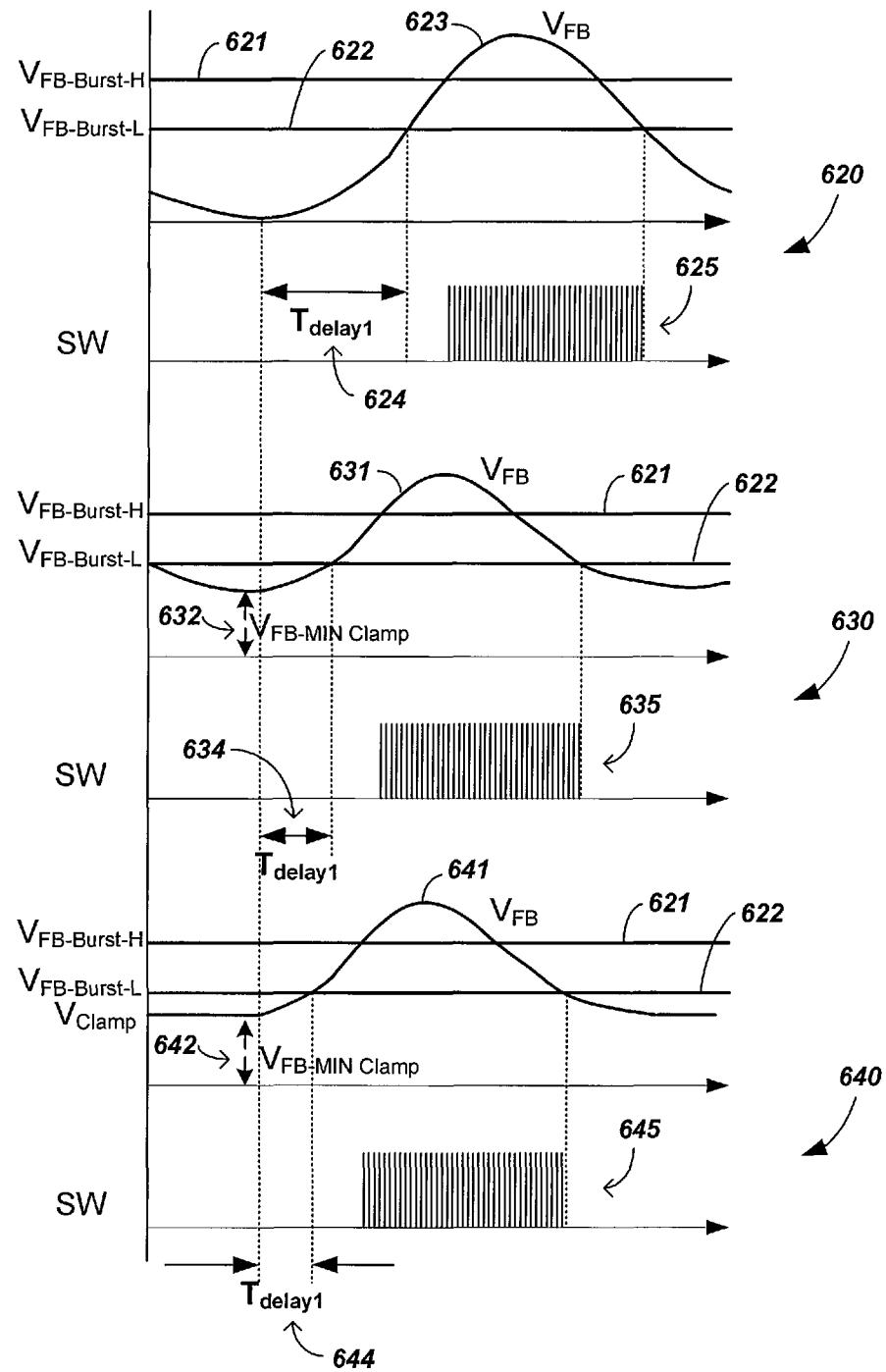
FIG. 21 shows waveforms of signals of the controller integrated circuits of FIGS. 17-20 in accordance with embodiments of the present invention.

FIG. 21 shows waveform sets 620, 630, and 640 in accordance with embodiments of the present invention. The waveform set 620 has waveforms of signals of a controller IC 101 without minimum feedback voltage clamping as in FIG. 17. The waveform set 620 is provided for comparison purposes. The waveform set 630 has waveforms of signals of a controller IC 101 with minimum voltage clamping implemented by adding an offset voltage as in FIG. 18 or by adding a voltage drop as in FIG. 19. The waveform set 640 has waveforms of a controller IC 101 with minimum voltage clamping implemented by adding a clamping circuit as in FIG. 20.

The waveform set 620 shows the feedback voltage VFB (FIG. 21, 623) and gate drive signal (FIG. 21, 625) for switching the transistor M1 without minimum feedback voltage clamping as in FIG. 17. Also shown in the waveform set 620 are the burst on threshold voltage (FIG. 21, 621) and the burst off threshold voltage (FIG. 21, 622) relative to the feedback voltage VFB (FIG. 21, 623). Without minimum feedback voltage clamping, the delay time (FIG. 21, 624) for the feedback voltage VFB to increase from when the heavy load is applied (in the example of FIG. 21, almost at the minimum of the feedback voltage VFB) to the burst off threshold voltage is relatively long, thereby delaying switching of the primary switch to increase the output voltage VOUT in response to rapid transition from light load condition to heavy load condition.

The waveform set 630 shows the feedback voltage VFB (FIG. 21, 631) and gate drive signal (FIG. 21, 635) for switching the transistor M1 with minimum feedback voltage clamping implemented by adding an offset voltage to the feedback voltage VFB as in FIG. 18 or by adding a voltage drop to the feedback voltage VFB as in FIG. 19. Also shown in the waveform set 630 are the burst on threshold voltage (FIG. 21, 621) and the burst off threshold voltage (FIG. 21, 622) relative to the feedback voltage VFB (FIG. 21, 631). The minimum feedback voltage level (FIG. 21, 632) provided by the added offset voltage or voltage drop decreases the delay time (FIG. 21, 634) for the feedback voltage VFB to increase from when the heavy load is applied to the burst off threshold voltage. This advantageously reduces the overall delay time for the feedback voltage VFB to increase to the burst on threshold and thereby initiate switching of the transistor M1 (FIG. 21, 635) to increase the output voltage.

The waveform set 640 shows the feedback voltage VFB (FIG. 21, 641) and gate drive signal (FIG. 21, 645) for switching the primary switch with minimum feedback voltage clamping implemented by clamping the minimum value of the feedback voltage VFB as in FIG. 20. Also shown in the waveform set 640 are the burst on threshold voltage (FIG. 21, 621) and the burst off threshold voltage (FIG. 21, 622) relative to the feedback voltage VFB (FIG. 21, 641). The minimum feedback voltage level (FIG. 21, 642), which is clamped to a predetermined value (FIG. 21, 642) decreases the delay time (FIG. 21, 644) for the feedback voltage VFB to increase to the burst off threshold voltage. This advantageously reduces the overall delay time for the feedback voltage VFB to increase to the burst on threshold and thereby initiate switching of the transistor M1 (FIG. 21, 645) to increase the output voltage.

Electrical circuits and methods for improving dynamic characteristics of power supplies have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A power supply comprising:
   a primary switch that is coupled to a primary winding on a primary side of a transformer;
   an output voltage feedback circuit that is configured to generate a feedback voltage that is indicative of an output voltage of the power supply on a secondary side of the transformer; and
   a controller integrated circuit that is configured to receive the feedback voltage and control the primary switch based on the feedback voltage, the controller integrated circuit being configured to start switching the primary switch to increase the output voltage when the feedback voltage reaches a first threshold voltage, to stop switching of the primary switch when the feedback voltage reaches a second threshold voltage, and to adjust the feedback voltage relative to the first threshold voltage in response to a load condition of the power supply changing from light load to heavy load.

2. The power supply of claim 1, wherein the controller integrated circuit adjusts the feedback voltage relative to the first threshold voltage by adding an offset voltage to the feedback voltage in response to the load condition of the power supply changing from light load to heavy load.

3. The power supply of claim 1, wherein the controller integrated circuit adjusts the feedback voltage relative to the first threshold voltage by lowering the first threshold voltage in response to the load condition of the power supply changing from light load to heavy load.

4. The power supply of claim 1, wherein the controller integrated circuit adjusts the feedback voltage relative to the first threshold voltage by lowering a feedback input impedance presented to the feedback voltage by the controller integrated circuit.

5. The power supply of claim 1, wherein the output voltage feedback circuit comprises an optocoupler comprising:
   a phototransistor and a light emitting diode, the phototransistor being coupled to a feedback pin where the controller integrated circuit receives the feedback voltage, and the light emitting diode being coupled to the output voltage on the secondary side of the transformer.

6. The power supply of claim 1, wherein the controller integrated circuit comprises a feedback voltage slope detection circuit that is configured to detect the load condition of the power supply changing from light load to heavy load by detecting that a slope of the feedback voltage is steeper than a predetermined slope.

7. A controller integrated circuit for controlling a switching operation of a primary switch of a power supply, the controller integrated circuit comprising:
- a feedback voltage detection circuit that is configured to receive a feedback voltage at a first pin, the feedback voltage being indicative of an output voltage of the power supply;
- a burst circuit that is configured to start switching of the primary switch when the feedback voltage reaches a first threshold voltage and to stop switching of the primary switch when the feedback voltage reaches a second threshold voltage; and
- a feedback voltage adjustment circuit that is configured to adjust the feedback voltage relative to the first threshold voltage in response to a load condition of the power supply changing from light load to heavy load.

8. The controller integrated circuit of claim 7, wherein the feedback voltage adjustment circuit comprises:
- an offset control circuit that is configured to add a voltage offset to the feedback voltage in response to the load condition of the power supply changing from light load to heavy load.

9. The controller integrated circuit of claim 8, wherein the offset control circuit is configured to clamp the feedback voltage to a predetermined voltage.

10. The controller integrated circuit of claim 9, wherein the predetermined voltage is the first threshold voltage.

11. The controller integrated circuit of claim 7, wherein the feedback voltage adjustment circuit comprises:
- a threshold adjustment circuit that is configured to lower the first threshold voltage in response to the load condition of the power supply changing from light load to heavy load.

12. The controller integrated circuit of claim 7, further comprising:
- a feedback voltage slope detection circuit that is configured to detect the load condition of the power supply changing from light load to heavy load by detecting that a slope of the feedback voltage is steeper than a predetermined slope.

13. The controller integrated circuit of claim 11, wherein the threshold adjustment circuit comprises a variable voltage source that is configured to generate the first threshold voltage.

14. The controller integrated circuit of claim 8, wherein the feedback voltage adjustment circuit comprises:
- an impedance adjustment circuit that is configured to adjust an input impedance presented by the controller integrated circuit to the feedback voltage in response to the load condition of the power supply changing from light load to heavy load.

15. A controller integrated circuit for controlling a switching operation of a primary switch of a power supply, the controller integrated circuit comprising:
- a burst circuit that is configured to start switching the primary switch when a feedback voltage that is indicative of an output voltage of the power supply reaches a first threshold voltage, the burst circuit being configured to stop switching of the primary switch when the feedback voltage reaches a second threshold voltage; and
- a feedback voltage minimum circuit that is configured to prevent the feedback voltage from decreasing below a minimum level.

16. The controller integrated circuit of claim 15, wherein the feedback voltage minimum circuit is configured to generate an offset voltage that is added to the feedback voltage.

17. The controller integrated circuit of claim 15, wherein the feedback voltage minimum circuit comprises an electrical component that develops a voltage drop in series with the feedback voltage.

18. The controller integrated circuit of claim 17, wherein the electrical component is connected to an impedance that pulls up a feedback pin of the controller integrated circuit, wherein the controller integrated circuit receives the feedback voltage on the feedback pin.

19. The controller integrated circuit of claim 18, wherein the feedback pin is coupled to an optocoupler that detects the output voltage of the power supply.

20. The controller integrated circuit of claim 15, wherein the feedback voltage minimum circuit comprises a clamp circuit that is configured to clamp a minimum value of the feedback voltage to the minimum level.

\* \* \* \* \*